United States Patent
Kuijper

(10) Patent No.: US 6,806,931 B1
(45) Date of Patent: Oct. 19, 2004

(54) IMAGE PROJECTION SYSTEM WITH IMPROVED CONTRAST HAVING SINGLE BIREFRINGENCE-COMPENSATING ELEMENT

(75) Inventor: Maarten Kuijper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/600,607

(22) PCT Filed: Nov. 20, 1998

(86) PCT No.: PCT/IB98/01853

§ 371 (c)(1), (2), (4) Date: Jul. 19, 2000

(87) PCT Pub. No.: WO00/31579

PCT Pub. Date: Jun. 2, 2000

(51) Int. Cl.[7] .......................................... G02F 1/1335
(52) U.S. Cl. ...................................... 349/121; 349/118
(58) Field of Search ............................... 349/117, 118, 349/121

(56) References Cited

U.S. PATENT DOCUMENTS

| | | | |
|---|---|---|---|
| 4,239,349 A | * 12/1980 | Scheffer | 349/117 |
| 5,490,006 A | * 2/1996 | Masumoto et al. | 359/73 |
| 5,504,603 A | * 4/1996 | Winker et al. | 359/73 |
| 5,518,783 A | 5/1996 | Kawata et al. | 428/1 |
| 5,548,422 A | * 8/1996 | Conner et al. | 349/98 |
| 5,583,677 A | * 12/1996 | Ito et al. | 349/118 |
| 5,583,679 A | * 12/1996 | Ito et al. | 349/118 |
| 5,638,197 A | * 6/1997 | Gunning, III et al. | 349/96 |
| 5,736,067 A | * 4/1998 | Kawata et al. | 252/299.5 |
| 5,737,048 A | * 4/1998 | Abileah et al. | 349/121 |
| 5,895,106 A | * 4/1999 | VanderPloeg et al. | 349/120 |
| 6,057,901 A | * 5/2000 | Xu | 349/121 |
| 6,292,242 B1 | * 9/2001 | VanderPloeg et al. | 349/118 |

FOREIGN PATENT DOCUMENTS

| | | | |
|---|---|---|---|
| EP | 0390511 A2 | 10/1990 | G03B/21/00 |
| WO | WO9605534 | 2/1996 | G02B/27/28 |

* cited by examiner

*Primary Examiner*—Dung T. Nguyen
*Assistant Examiner*—Andrew Schechter

(57) ABSTRACT

The present invention relates to an image projection system (1) comprising an illumination system (3) for supplying an illumination beam, a modulation system (11) for modulating said illumination beam, and an optical system for projecting an image. The modulation system (11) comprises at least one image display panel of the TN type. The liquid crystal layer (13) is enclosed between a first polarizer (12) and a second polarizer (14). A single birefringence-compensating element (27) is present between the liquid crystal layer (13) and one of the polarizers (12; 14). The element (27) has a tilted director profile whose projection in the plane of the polarizers encloses an angle $0° < \phi \leq 15°$ with the active rubbing direction of the liquid crystal layer.

9 Claims, 5 Drawing Sheets

IMAGE PROJECTION SYSTEM WITH IMPROVED CONTRAST HAVING SINGLE BIREFRINGENCE-COMPENSATING ELEMENT

BACKGROUND OF THE INVENTION

The invention relates to an image projection system comprising an illumination system for supplying an illumination beam, a modulation system for modulating said illumination beam in conformity with image information to be projected, and an optical system for projecting an image, the modulation system comprising at least one liquid crystalline image display panel having a first and a second polarizer between which a layer of TN (twisted nematic) liquid crystalline material is enclosed.

The invention also relates to a head-mounted display.

An increasingly higher image quality is aimed at in future image projection systems with liquid crystalline image display panels. The image contrast on the projection screen is also determined by the absorption which can be realized in the dark state of the panels. Pixels of a TN-LCD (twisted nematic liquid crystal display) are maximally a transparent if there is no voltage across the pixels. In an image, these pixels are in a bright state. Pixels across which a voltage is applied absorb light and are thus in the dark state. However, the absorption is limited and is not the same for all directions of incidence of the light beam. Consequently, the dark state may still be relatively bright, notably for directions of incidence of the light for which the absorption is worse. This gives rise to a relatively poor image contrast. Moreover, a poor contrast of the image display panel has detrimental effects on the color reproduction.

The image contrast is determined, inter alia, by the transmission characteristic of the image display panel for the directions from which the light beams are incident and consequently also by the illumination profile which is incident on the image display panel. Moreover, only the light which is incident on the projection lens within a given angle will be passed. This is referred to as the acceptance angle. A maximal display panel contrast is aimed at within this acceptance angle.

The viewing angle dependence of the image contrast as a consequence of the dependence of the image display panel on the direction of the illumination beam results from the residual retardation of the liquid crystalline material. Light which propagates in directions which are not parallel to the director of the liquid crystalline material will undergo a small birefringence. An image projection system of the type described in the opening paragraph is known from, for example, European patent application EP 0 390 511, in which this problem is solved by providing at least one additional optically transparent element of a positive birefringent material at the liquid crystalline layer, with optical properties which compensate for said residual retardation in a single viewing direction.

The known system has the drawback that the contrast is only optimized within a very narrow cone of viewing directions, with the result that the high contrast area is only shifted in position. Moreover, the parameters of the compensation elements have a very small tolerance.

OBJECTS AND SUMMARY OF THE INVENTION

It is an object of the present invention to provide an image projection system in which a relatively high image contrast can be realized, obviating the above-mentioned drawbacks.

To this end, the image projection system according to the invention is characterized in that the image display panel comprises a single birefringence-compensating element between the layer and one of the two polarizers, which element has a tilted optical director profile whose projection in the plane of the polarizers encloses an angle $\phi$ different from 0 with the active rubbing direction of the layer.

The active rubbing direction is understood to mean the rubbing direction which determines the contrast in the viewing directions perpendicular thereto, in which directions the contrast is to be improved. The contrast in a given viewing direction is determined by the part of the liquid crystalline layer whose rubbing direction is substantially perpendicular to this viewing direction.

The present invention is based on the recognition that the fact that a relatively small viewing angle with respect to the illumination system is sufficient for a liquid crystalline image display panel in an image projection system can be used to great advantage. The high contrast area is to be widened and shifted towards the directions from which the main illumination beams illuminating the image display panel originate. The viewing angle within which the contrast is to be improved is determined by the angular spread of the illumination beams and by the acceptance angle of the projection lens.

Since, for projection, a high contrast area is sufficient which extends in the direction of the main illumination beams of the illumination system, which is in contrast to direct-vision systems in which the high contrast area is to extend both in the horizontal and the vertical direction, it is sufficient to use a single birefringence-compensating element. Moreover, the element is, rotated so that the optical axis of the element encloses an angle $\phi$ different from 0 with the active rubbing direction of the liquid crystalline material. The drastic change of the symmetry of the contrast curves thus does not have any detrimental effects for projection applications. Since $\phi$ is different from 0, an improved contrast is now also possible upon perpendicular incidence.

Since use is made of a single element, the material costs are reduced and less absorption will occur in the bright state. Moreover, the tolerances are less strict than in the known systems.

A preferred embodiment of the image projection system according to the invention is characterized in that the birefringence-compensating element is an element having a negative birefringence.

Since liquid crystalline material has a positive birefringence, compensation with an element having a negative birefringence and a tilted optical director profile is simplest. Moreover, this element will ensure that the high contrast area is enlarged in the desired viewing directions.

It is to be noted that it is known per se from, for example, U.S. Pat. No. 5,583,677 to provide an image display panel with a negative birefringent foil. Here, however, in the case of a single element, this element is positioned at an angle of $\phi=45°$ so that there is only a general widening which is not optimized for a maximum contrast in the directions from which the main light beams illuminate the image display panel. Moreover, the tolerances are very strict because the optical axis of the foil is positioned at an angle of 45° with respect to the polarizer.

A further embodiment of the image display device according to the invention is characterized in that $0 < |\phi| \leq 15°$.

Since, in the present invention, $|\phi|$ is only a few degrees, the contrast of the image display panel is considerably less sensitive to variations of thickness, tilt and retardation.

A further embodiment of the image projection system according to the invention is characterized in that the element is present on that side of the liquid crystalline material where said material has its active rubbing direction.

At this position, the element will have the optimal effect.

A negative birefringent element with a tilted optical director profile may be obtained in different manners.

A first embodiment of the image projection system according to the invention is characterized in that the element comprises a negative birefringent foil having a tilted optical director profile.

A second embodiment of the image projection system according to the invention is characterized in that the element comprises a plurality of positive birefringent foils, at least one of which has a tilted optical director profile.

The image projection system described above may be, for example, an LCD projection system or a head-mounted display. In the case of an LCD projection system, the optical system consists of a projection lens system. In both applications, it may be very advantageous to widen the high contrast area and shift it towards given viewing directions without the attendant change in the contrast curve having detrimental consequences.

These and other aspects of the invention are apparent from and will be elucidated with reference to the embodiments described hereinafter.

DESCRIPTION OF THE PREFERRED EMBODIMENTS

Figure 1:
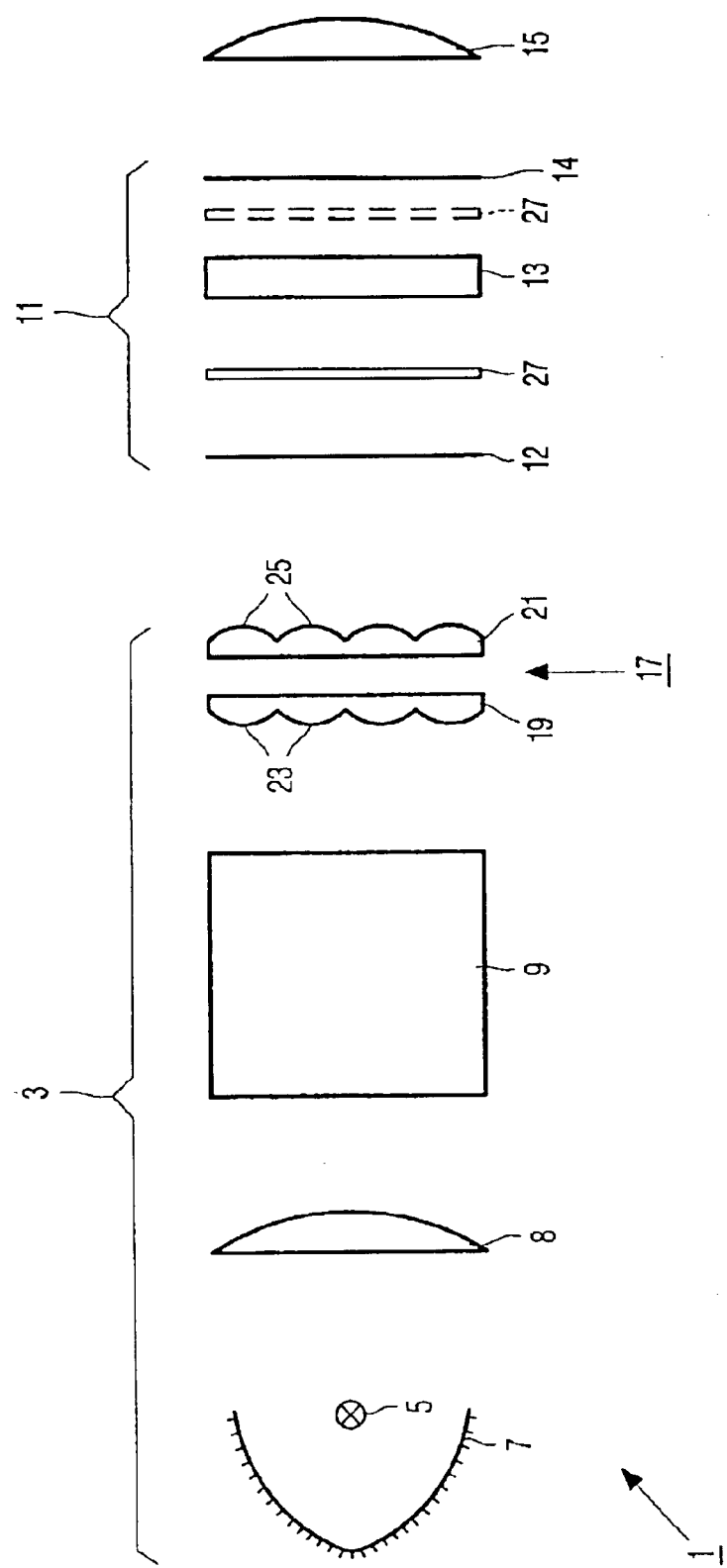
FIG. 1 shows a first embodiment of an image projection system according to the invention, in the form of an LCD projection system.

The LCD projection system 1 shown diagrammatically in FIG. 1 comprises an illumination system 3 for supplying an illumination beam. The illumination system 3 comprises a radiation source 5 which is partly surrounded by, for example, a parabolic reflector 7 and precedes a condensor lens 8. The radiation source may be alternatively surrounded by a spherical reflector. In that case, the condensor lens may be dispensed with. The light generated by the radiation source 5 is incident on a polarization-converting system 9. This system 9 ensures that substantially all the light from the radiation source is converted into light having the same direction of polarization before it is incident on the modulation system 11. Such a polarization-converting system is known per se, for example, from the published international patent application WO 96/05534 in the name of the applicant.

The modulation system 11 comprises at least one image display panel 13 for modulating the light supplied by the illumination system 3 in conformity with the information to be projected. The image display panel may be a monochrome or a color panel. Alternatively, two or three image display panels may be provided, in different combinations, dependent on the desired resolution and color. The image display panel 13 is surrounded by a first polarizer 12 and a second polarizer 14, referred to as analyzer.

A projection lens system, represented by a single lens 15 for the sake of simplicity, for projecting the image on a projection screen (not shown) is arranged behind the modulation system.

The illumination system 3 further comprises an integrator system 17 for optimizing the image homogeneity and the light output of the system. The integrator system 17 may consist of a first lens plate 19 and a second lens plate 21. Each lens plate 19, 21 comprises a plurality of lenses denoted by 23, 25, respectively, which are arranged in a matrix. Each lens 23 of the first lens plate 19 forms a lamp image in a corresponding lens 25 of the second lens plate 21. Each lens 25 of the second lens plate 21 forms an image of the corresponding lens 23 in the first lens plate 19 on the display panel, with all images on the display panel being in register.

The integrator system may be alternatively formed by an optically transparent bar. The light coupled into the bar will be reflected many times on the side walls, so that a homogeneous light distribution will be realized on the end face of the bar remote from the radiation source.

The image display panel, or image display panels in the case of using more than one panel, are, for example of the TN (twisted nematic) type. Such a panel is subdivided into pixels which can be driven by means of electrodes in conformity with the image information to be displayed. The layer of liquid crystalline material is surrounded by a first polarizer on the side of the radiation source and by a second polarizer, referred to as analyzer, on the side of the projection lens system. The pixels of such a panel are in a transparent state when there is no voltage across the pixels. Such pixels are in the bright state in an image. When a voltage is applied across the pixels, the direction of polarization of the incident light will be rotated. Light will be blocked by the crossed polarizers so that these pixels are in the dark state in the image. However, TN image display panels have the drawback that their viewing direction is sensitive to the incident light beams, with the result that the contrast of the image display panel is also dependent on the viewing direction. In fact, the absorption is limited and is not the same for all directions of incidence of the light beam. Consequently, the dark state may be still relatively bright, notably for directions of incidence of the light for which the absorption is worse. This gives rise to a relatively poor image contrast.

Figure 2A:
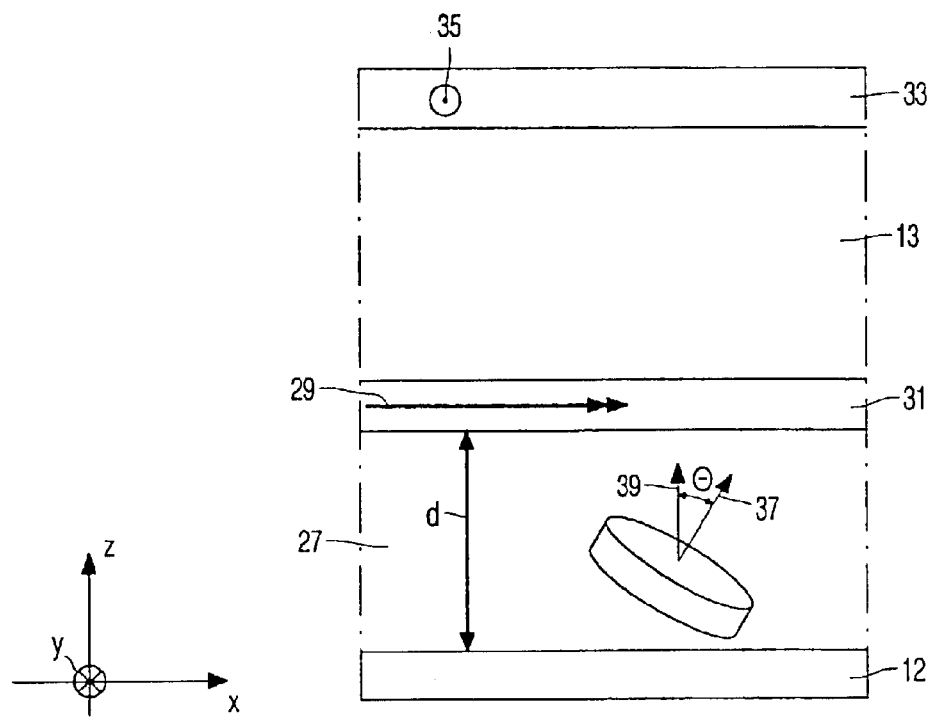
FIG. 2(a) shows an embodiment of a birefringence-compensating element in an image display panel, used in the image projection system according to the invention.

The present invention proposes to provide one birefringence-compensating element 27 between the liquid crystalline material and one of the polarizers surrounding the layer of liquid crystalline material on both sides. This element 27 has a tilted optical director profile whose projection in the plane of the polarizers encloses an angle $\phi$ different from 0 with the active rubbing direction of the layer. The active rubbing direction is to be understood to mean the rubbing direction which determines the contrast in the viewing directions perpendicularly thereto, in which directions the contrast is to be improved. The contrast in a given viewing direction is determined by the part of the liquid crystalline layer whose rubbing direction is substantially perpendicular to this viewing direction. FIG. 2(a) illustrates an example. The liquid crystalline layer 13 is present between two substrates 31, 33. In the substrates, the rubbing direction of the liquid crystalline material on the relevant substrate is denoted by the arrows 29 and 35. It is assumed that the active rubbing direction is the one denoted by arrow 29. The birefringence-compensating element 27 has a thickness d and is present between the polarizer 12 and the liquid crystalline layer 13. The arrow 37 indicates the direction of the director of the element and arrow 39 indicates the normal on the element. θ thus indicates the tilt angle of the director profile of the element.

Figure 2B:
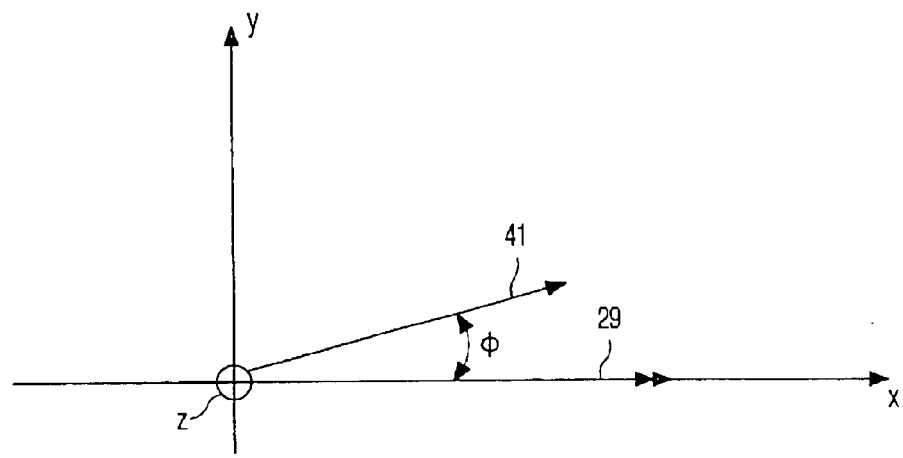
FIG. 2(b) shows the position of the different optical axes in the plane of the polarizers.

FIG. 2(b) illustrates the angle ϕ. The arrow 41 indicates the projection of the optical director of the element 27 in the plane of the polarizers. The angle ϕ thus is the angle enclosed between the active rubbing direction 29 and the projection of the optical director of the element 27 in the plane of the polarizers. FIGS. 2(a) and 2(b) refer to the same system of co-ordinates (x, y, z).

Light which propagates in a direction perpendicular to the plane of the optical axis, i.e. the (x-z) plane, of the element will undergo a large birefringence, whereas light which propagates in a direction located in the (x-z) plane will undergo a small birefringence. When the projection of the optical axis of the element coincides with one of the axes of the polarizers, the light which propagates in the plane of the optical axis of the element, i.e. the x-z plane, will not undergo birefringence. In that case, only the light beam perpendicular to the tilted optical axis will undergo birefringence because the passed direction of polarization encloses an angle different from 90° with this optical axis. Light which propagates in the plane of the optical axis will not undergo any retardation because this light is polarized in accordance with an ordinary axis or in accordance with the effective extraordinary axis.

The birefringence-compensating element is preferably an element having a negative birefringence. In fact, the liquid crystalline material has a positive birefringence. An element with negative birefringence can be realized in different manners. The element may comprise a negative birefringent foil having a tilted optical director profile or a plurality of positive birefringent foils, at least one of which has a tilted optical director profile.

Figure 3A:
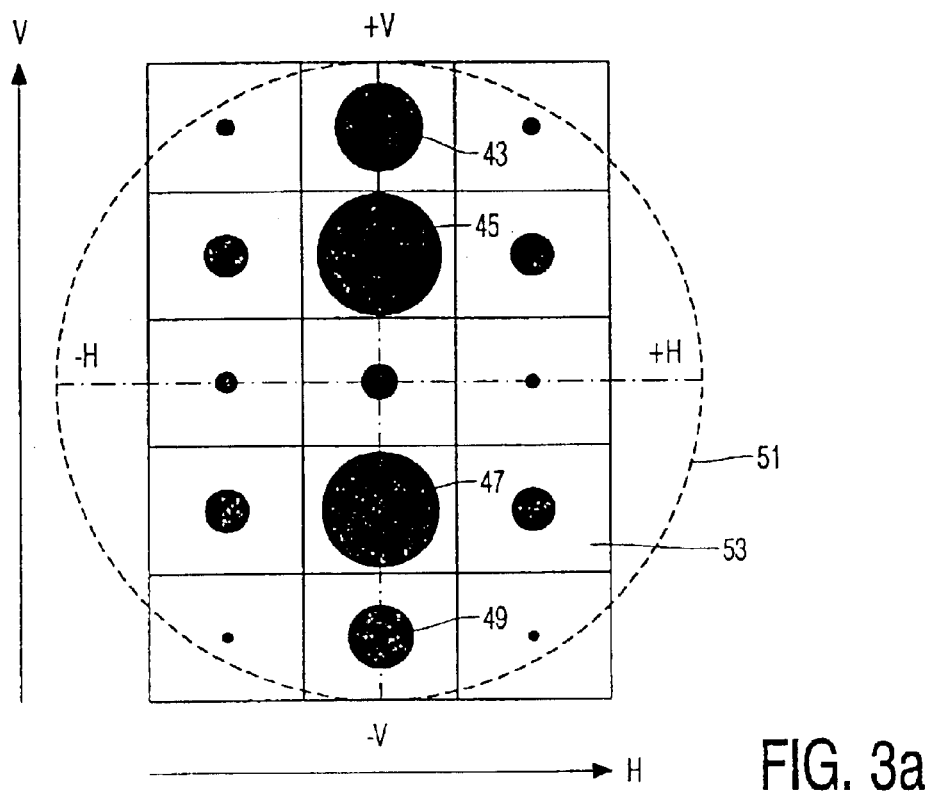
FIG. 3(a) shows an example of a possible illumination profile as presented to the image display panel.

FIG. 3(a) shows an example of an illumination profile as can be presented to an image display panel in an LCD projection system with integrator plates. In FIGS. 3(a) to 3(d), the reference V denotes the vertical viewing direction and H denotes the horizontal viewing direction. The main light beams 43, 45, 47, 49 originate from the vertical direction. Here, a contrast improvement of the image display panel is desired in the vertical direction. The broken-line circle 51 indicates the acceptance angle of the projection lens. Each of the light spots such as, for example 53, is an image of the radiation source in the integrator lens. According to the present invention, it is proposed to use a compensation element with an optical axis perpendicular to the vertical viewing direction. In this way, the absorption for the dark state will be improved considerably.

The retardation of the element is determined by the thickness d of the element and the difference between the ordinary refractive index $n_o$ and the extraordinary refractive index $n_e$, namely: $d(n_e-n_o)$. An optimal situation can be achieved by a rotation towards the mid-plane detector of the liquid crystalline layer. Preferably, ϕ is between 0° and 15°. The mid-plane director is the average direction in which the molecules are twisted in the liquid crystalline layer.

For example, with a negative birefringent element as known per se from, for example, U.S. Pat. No. 5,518,783, a high contrast area which is adapted to the illumination profile shown in FIG. 3(a) can be obtained at a |ϕ| of 5°, a retardation of −155 nm and a tilt of 30°.

ϕ=5° means that the projection of the optical axis of the element in the plane of the polarizer is rotated 5° in the direction of the projection of the mid-plane director, in the plane of the polarizer, with respect to the active rubbing direction.

Figure 3B:
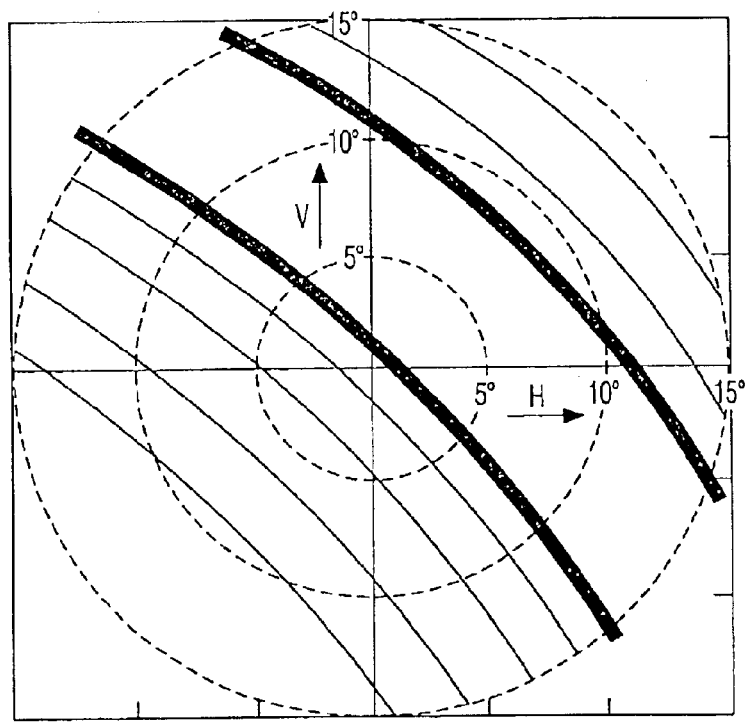
FIGS. 3(b), 3(c) and 3(d) show examples of iso-contrast curves for an image display panel without a compensation element, with a negative birefringence-compensating element having a tilted director profile in which $\phi=0°$ and with a negative birefringence-compensating element having a tilted director profile in which $\phi=5°$.
Figure 3C:
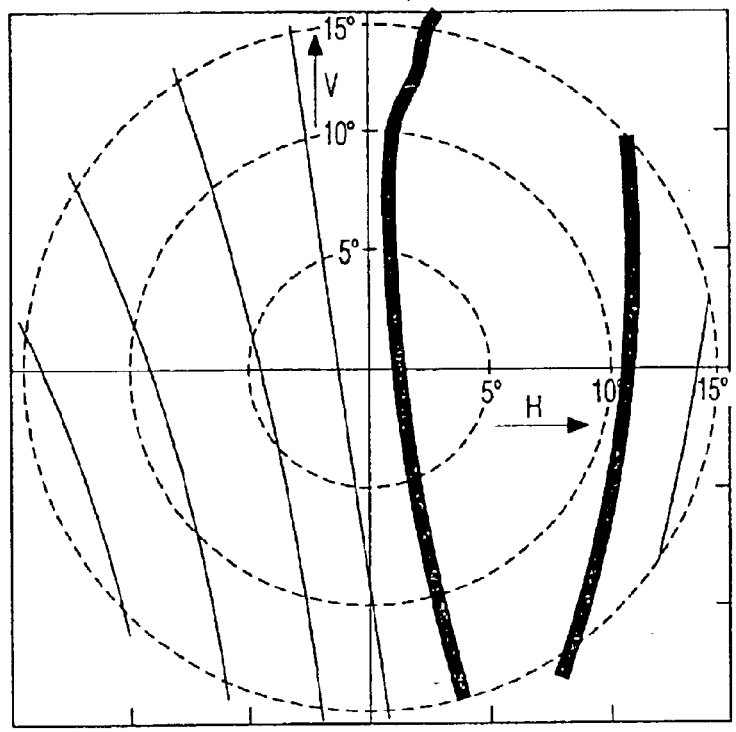
Figure 3D:
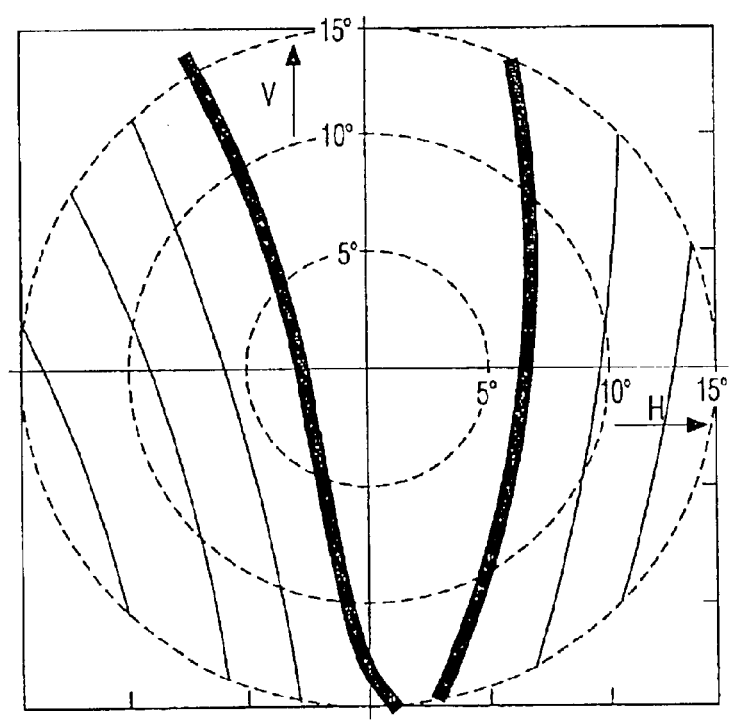

FIG. 3(b) shows an iso-contrast curve for an image display panel without a compensation element. FIG. 3(c) shows an iso-contrast curve for a display panel with a negative birefringence-compensating element having a tilted optical director profile as used in the invention, but in which ϕ=0°. FIG. 3(d) shows an iso-contast curve for a display panel as used in an image projection system according to the invention. The angle ϕ is 5°. In FIGS. 3(c) and 3(d), the retardation is −155 nm and θ=30°.

The element 27 may be present either in front of or behind the layer 13. The element 27 is preferably provided closest to the side of the liquid crystalline layer where this layer has its active rubbing direction, which direction determines the directions in which the compensation must take place, because the element then has the optimal effect. Since the element 27 may be present on either side, the less desired possibility is also shown, in a broken line, in FIG. 1.

The configuration may be optimized by varying the tilt angle θ of the optical director of the element, varying the retardation d.αn and varying the orientation ϕ with in respect to the active rubbing direction.

In the present invention, the contrast on the screen is thus considerably improved by providing a compensation element between a polarizer and the LC material, so that the viewing angle dependence of the image display panel with respect to the illumination beam and the illumination profile of the illumination system are adapted to each other. The high contrast area is enlarged and shifted towards the directions from which the main illumination beams originate. Consequently, in these directions, the image display panel will absorb considerably much better in the dark state. The contrast curve is thus adapted to the illumination profile. The viewing angle in which the contrast must be improved is determined by the angular spread of the illumination cones and the acceptance angle of the projection lens.

Figure 4:
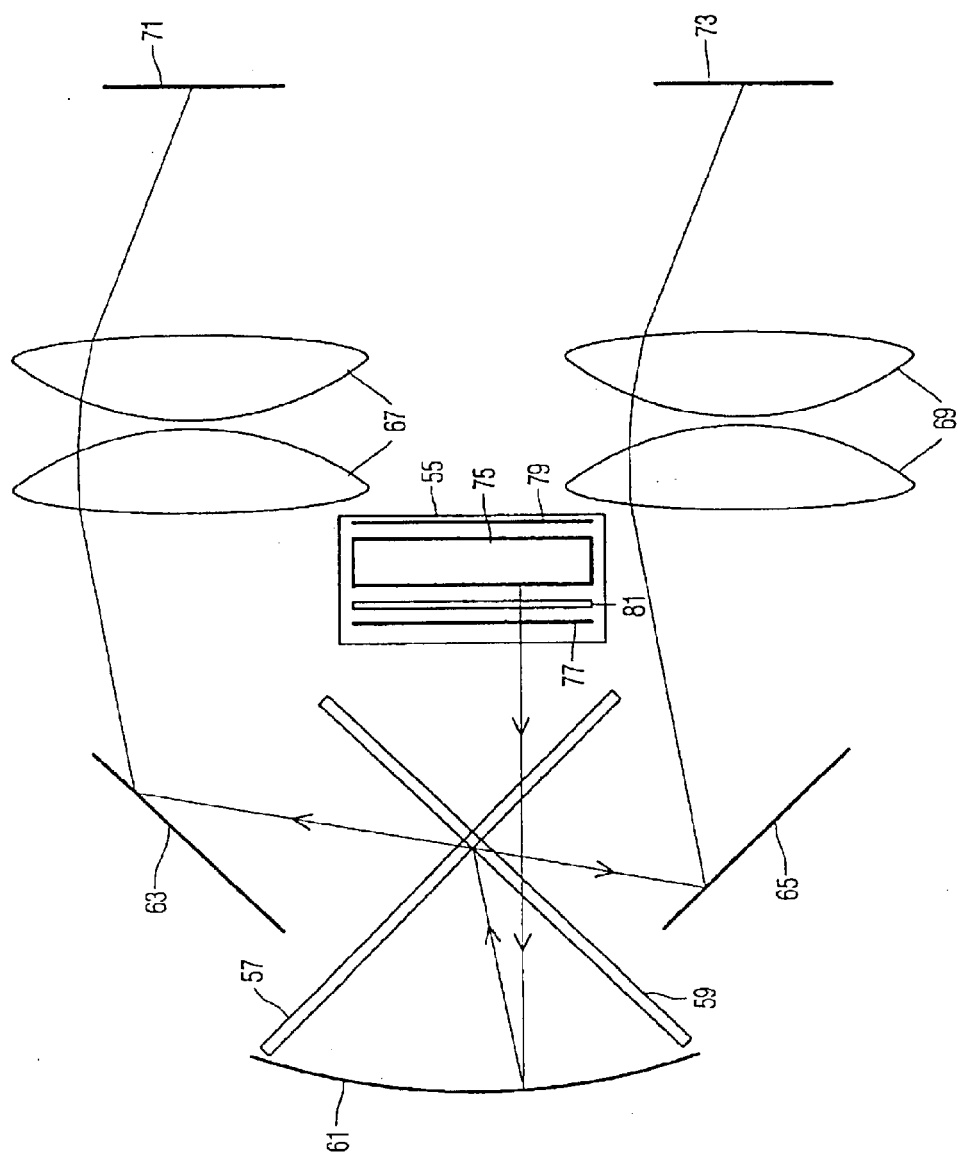
FIG. 4 shows a second embodiment of an image projection system according to the invention, in the form of a head-mounted display.

FIG. 4 shows diagrammatically an embodiment of a head-mounted display in which the present invention may be used to great advantage. In a head-mounted display, it may be very much desirable, for example, to enlarge and shift the contrast area in the horizontal direction. A two-dimensional image is generated by means of an image display panel 55 to which the image information to be projected is applied. The generated two-dimensional image is divided via two crossed, half beam splitters 57, 59 into two beam portions, one for each eye. FIG. 4 shows the light path of a light ray coming from a pixel in the display panel. Approximately half of the light ray is transmitted by each of the half beam splitters 57, 59. Subsequently, each of the two light ray portions are reflected by a concave mirror 61 which reflects and focuses the images towards the half beam splitters 57, 59 by which each light ray portion is reflected into one channel. The reflected image is projected via a flat mirror 63, 65, one for each side, in an eyepiece-lens combination 67, 69, so that the image is collimated and projected for each eye in an exit pupil 71, 73. The image display panel 55 comprises a liquid crystalline layer 75 and a first polarizer 77 and a second polarizer 79. In accordance with the present invention, the image display panel 55 is provided with a birefringence-compensating element 81 so that, also in this case, the high contrast area can be adapted to the illumination profile.

What is claimed is:

1. An image projection system comprising an illumination system for supplying an illumination beam, a modulation system for modulating said illumination beam in conformity with image information to be projected, and an optical system for projecting an image, said modulation system comprising at least one liquid crystalline image display panel having a first and a second polarizer between which a layer of TN (twisted nematic) liquid crystalline material is enclosed, characterized in that a single birefringence-compensating element is located between the layer of TN (twisted nematic) liquid crystalline material and one of the two polarizers, which element is present on that side of the liquid crystalline material having its active rubbing direction and which element has a tilted optical director profile whose projection in the plane of the polarizers encloses an angle $\phi$ having a value $0°<\phi\leq15°$ with the active rubbing direction of the layer.

2. An image projection system as claimed in claim 1, characterized in that the birefringence-compensating element is an element having a negative birefringence.

3. A head-mounted display comprising a liquid crystalline image display panel, an optical system for imaging an image in an observer's eye, and a head-support, wherein the liquid crystalline display panel is implemented as the image display panel in the image projection system as claimed in claim 2.

4. A liquid crystalline image display panel for use in an image projection system, comprising a layer of TN (twisted nematic) liquid crystalline material which is enclosed between a first and a second polarizer, wherein the, liquid crystalline image display panel is implemented as recited in claim 2.

5. An image projection system as claimed in claim 1, characterized in that the element comprises a negative birefringent foil having a tilted optical director profile.

6. A head-mounted display comprising a liquid crystalline image display panel, an optical system for imaging an image in an observer's eye, and a head-support, wherein the liquid crystalline display panel is implemented as the image display panel in the image projection system as claimed in claim 5.

7. A liquid crystalline image display panel for use in an image projection system, comprising a layer of TN (twisted nematic) liquid crystalline material which is enclosed between a first and a second polarizer, wherein the liquid crystalline image display panel is implemented as recited in claim 5.

8. A head-mounted display comprising a liquid crystalline image display panel, an optical system for imaging an image in an observer's eye, and head-supporting means, characterized in that the liquid crystalline display panel is implemented as the image display panel in the image projection system as claimed in claim 1.

9. A liquid crystalline image display panel for use in an image projection system, comprising a layer of TN (twisted nematic) liquid crystalline material which is enclosed between a first and a second polarizer, characterized in that the liquid crystalline image display panel is implemented as claimed in claim 1.

* * * * *